United States Patent [19]

Higashi

[11] Patent Number: 4,885,938
[45] Date of Patent: Dec. 12, 1989

[54] FLOWMETER FLUID COMPOSITION CORRECTION

[75] Inventor: Robert E. Higashi, Shorewood, Minn.

[73] Assignee: Honeywell Inc., Minneapolis, Minn.

[21] Appl. No.: 285,896

[22] Filed: Dec. 16, 1988

[51] Int. Cl.[4] .............................................. G01F 1/68
[52] U.S. Cl. ................................. 73/204.18; 73/861.02
[58] Field of Search .......... 73/861.02, 204.18, 204.19, 73/204.26; 364/510

[56] References Cited

U.S. PATENT DOCUMENTS

| 1,769,358 | 7/1930 | Piniterton et al. ........... 73/204.18 X |
| 4,478,076 | 10/1984 | Bohrer . |
| 4,478,077 | 10/1984 | Bohrer et al. . |
| 4,501,144 | 2/1985 | Higashi et al. . |
| 4,555,939 | 12/1985 | Bohrer et al. . |
| 4,651,564 | 3/1987 | Johnson et al. . |
| 4,683,159 | 7/1987 | Bohrer et al. . |
| 4,685,331 | 8/1987 | Renken et al. ................... 73/204.26 |

OTHER PUBLICATIONS

Datametrics Bulletin 600 published 1952.

Primary Examiner—Herbert Goldstein
Attorney, Agent, or Firm—Omund R. Dahle

[57] ABSTRACT

Certain relationships among the mass flow signal the thermal conductivity, specific heat and density of the fluid measured can be used to correct a mass flowmeter measurement with respect to changes in composition of the fluid.

4 Claims, 3 Drawing Sheets

FLOWMETER FLUID COMPOSITION CORRECTION

CROSS REFERENCE TO RELATED APPLICATION

Reference is made to other related applications Ser. Nos. 285,890 and 285,897 filed of even date and assigned to the common assignee of the present application.

BACKGROUND OF THE INVENTION

1. Field of the Invention

The present invention relates to fluid flow measurement and, more particularly, addresses to overcoming inaccuracies in flow measurement. The invention eliminates errors in mass flow rates measured for various gaseous fluids of interest with respect to compositional changes.

2. Related Art

Hot film microanemometer packages for general use are known for both uni- and bi-directional flow applications. An example of such a device is illustrated and described in U.S. Pat. No. 4,501,144 to Higashi et al. The microanemometers or "microbridges" themselves are quite inexpensive to produce.

As will be described in greater detail below, such microanemometers are capable of quite accurate flow sensing when directly exposed to a stream of fluid flowing past, especially if such flow be laminar. In this manner such a sensor can be used to directly measure the dynamic flow characteristics of the fluid.

While such a sensing system can be used to measure mass flow, a great deal of error has been experienced with respect to changes in composition of the measured fluid in prior devices using the system. Thus, a need has existed for a mass flowmeter of the microanemometer class which is less sensitive to changes in the composition of the measured fluid.

SUMMARY OF THE INVENTION

The present invention makes use of a second microanemometer sensor not directly exposed to the flowing fluid, but in more remote communication with that fluid that can be used to measure certain parameters related to the fluid which require a more static environment. Such a sensor is used for the direct measurement of thermal conductivity, $k$, and specific heat, $c_p$, in accordance with a known technique which allows the accurate determination of both properties in a sample of interest using a single sensing system. In addition these properties allow the determination of the density, or $q$.

In accordance with the present invention, it has been discovered that certain relationships exist among the nulled mass flow, at $M_o$, i.e., the mass flow signal corrected by subtracting the value obtained at zero flow, $c_p$, $k$, and $q$. More specifically, if the specific heat, $c_p$, the thermal conductivity, $k$, and the density, $q$, of the flowing fluid are known it has been found empirically that the following correction may be applied to the total mass flow, $M$, with respect to the nulled mass flow, $M_o$.

The relation may be represented by:

$$M = \frac{M_o c_p}{k(3.8 + q)} \quad (I)$$

In addition an empirical correction has been shown to exist between the actual dynamic sensor output signal, S, and the nulled or zero flow output signal, $S_o$ which may be approximated by:

$$S = S_o \{k(3.8+q)/c_p\}^{0.4} \quad (II)$$

The technique of the present invention has been verified specifically with respect to Argon, Ar, helium, He, methane, $CH_4$, carbon dioxide, $CO_2$, and propane, $c_3H_8$. It is believed to be valid, however, for most, if not all common gases of commerce.

BRIEF DESCRIPTION OF THE DRAWINGS

In the drawings:

FIGS. 1 and 1a include a schematic diagram showing a sectional view of a flowmeter and a schematic of associated I/O devices for a flowmeter of the invention;

DETAILED DESCRIPTION

Figure 1:
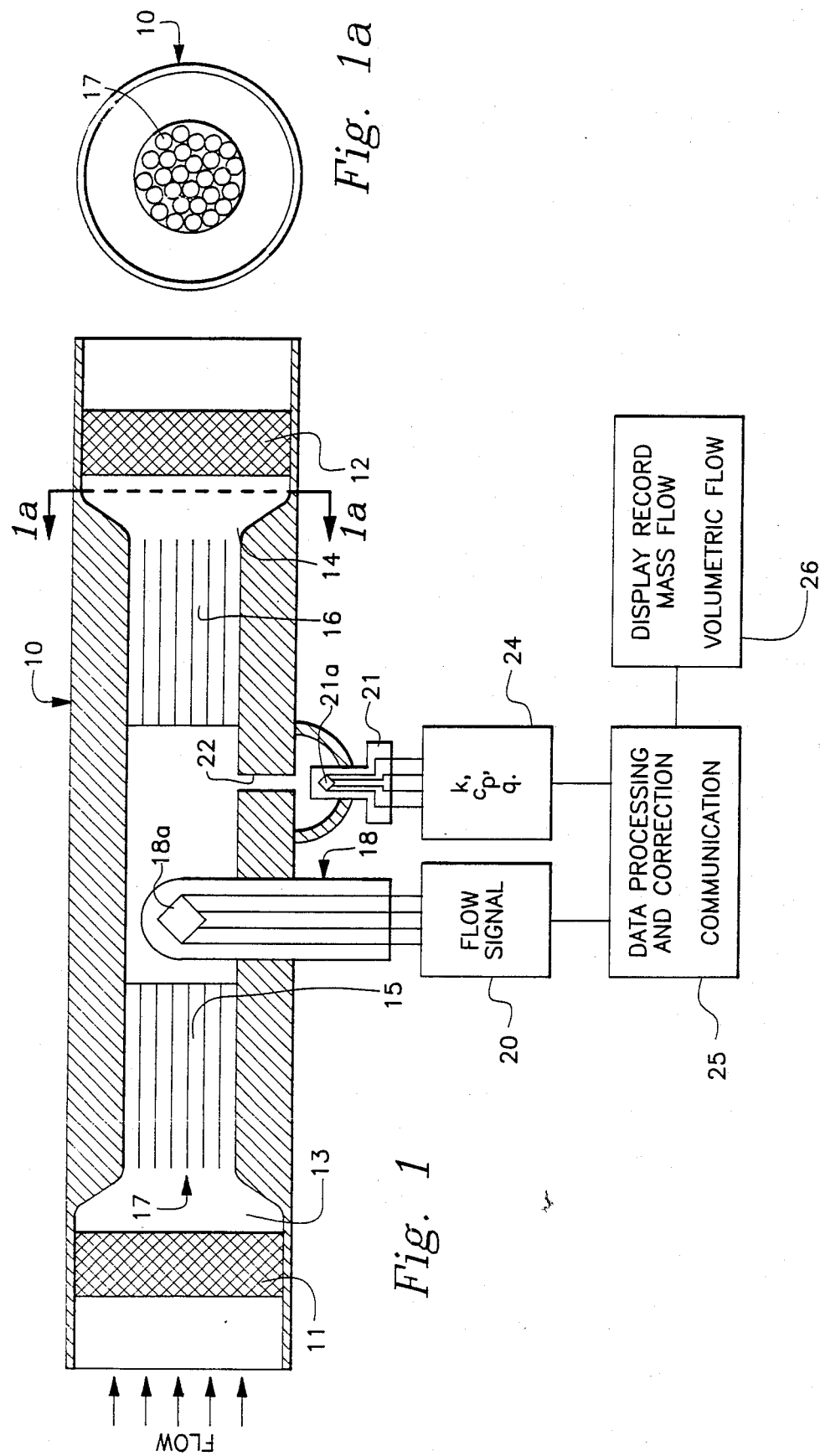

FIGS. 1 and 1a depict one embodiment of a flow meter utilizing the concept of the present invention. The system is depicted as an integral part of a length of pipe, as a gas pipe, or other conduit member or meter body member 10 which can easily be adapted to fit into almost any existing piping scheme as between a pair of spaced unions, couplings or the like. The basic system includes a pair of filter members 11 and 12 flanking a capillary system which includes means for reducing the conduit diameter at 13 and 14 in conjunction with entry and exit to a split bundle containing parts 15 and 16 of capillary tubes 17. The reducing sections 13 and 14 create a plenum effect for entry and exit of the fluid to the capillary bundle. This further reduces overall system pressure drop and velocity head effect.

A microbridge or microanemometer sensor package for sensing flow through the system is depicted generally at 18. Electrical connections, via pins 19 connect the microanemometer to a source of power for the heater or heaters and external signal receiving and processing means 20 to interpret the output. A remote or static microbridge or microanemometer 21 with sensor 21a communicates with the flowing fluid of interest via an opening as at 22 in the meter body 10 such at a representative composition is observed in what is basically a static environment with respect to flow. The output of sensor 21a is carried by pins 23 to input/output, I/O, device 24 from which an input is also received in the form of power to the heater element.

The I/O devices 20 and 24 connect with a data processing and communications system 25 which, in turn, is connected to a display/record output device 26 in a well-known manner.

Generally, with respect to the thin film 10 microbridge or anemometer sensors such as those depicted by reference numerals 18a and 21a, recently very small and very accurate microbridge semiconductor chip sensors have been described in which etched semiconductor microbridges are used as condition or flow sensors. Such sensors might include, for example, a pair of thin film sensors flanking a thin film heater. Semiconductor chip sensors of the class described are treated in a more detailed manner in one or more of patents such as 4,478,076, 4,478,077, 4,501,144, 4,555,939, 4,651,564 and 4,683,159 all of common assignee with the present invention. To the extent necessary additional details with respect to the microbridge sensors may be incorporated by reference from these cited documents.

For the purposes of the present application, it should suffice to say that if the dynamic flow sensor 18a, for example, comprises a pair of thin film sensors symmetrically flanking a thin film heater, for example, the sensor can be used to sense flow in either direction. That is, of course, provided that the chip assembly positions the sensor in the proper orientation so that the flow meets the microbridge at a right angle in the assembled meter. This further allows the flowmeter system of the present invention to be reversible with respect to the conduit system of the fluid of interest as symmetry is preserved.

The sensor 18a, then, is directly exposed to the stream of fluid flowing past it in the conduit. This sensor is used to directly measure the dynamic flow characteristics of the fluid.

The second microanemometer sensor 21a which also may be mounted back-to-back with the sensor 18a enables other parameters of the fluid to be measured simultaneously with the dynamic flow. While the sensor 21a is not directly exposed to the flowing fluid, it is in direct communication with that fluid and can be used to measure certain parameters related to the fluid which are facilitated by a more static environment.

Such a sensor can be used for the direct measurement of thermal conductivity, k, and specific heat, $c_p$, in accordance with a technique which allows the accurate determination of both properties and a sample of interest using a single sensing system. That technique contemplates generating an energy or temperature pulse in one or more heater elements disposed in and closely coupled to the fluid medium of interest. Characteristic values of k and $c_p$ of the fluid of interest then cause corresponding changes in the time variable temperature response of the heater to the pulse. Under relatively static sample flow conditions this, in turn, induces corresponding changes in the time variable response of or more temperature responsive sensors coupled to the heater principally via the fluid medium of interest.

The thermal pulse of this source need be only of sufficient duration that the heater achieve a substantially steady-state temperature for a short time. This pulse produces both steady-state and transient conditions in the sensor. Thermal conductivity, k, and specific heat, $c_p$, can be sensed within the same sense thermal pulse by using a steady-state temperature plateau to determine k, which is then used with the rate of change temperature in the transient condition to determine $c_p$. Such a system is described in greater detail in co-pending application Ser. No. 210,892, filed June 24, 1988 and assigned the same assignee as the present application.

In addition, it has been found that once the values of the specific heat and thermal conductivity have been determined, these measurements can be used to determine the density or specific gravity, $\rho$, or q, of the fluid of interest as a function of $c_p$, k, according to an empirical polynomial relationship. This technique is more specifically illustrated and described in patent application, Ser. No., 211,014, also filed June 24, 1988, and assigned to the same assignee as the present application.

The availability of all the measurements characterizing the fluid which can be derived from the combination of the exposed and static microanemometer sensors to the flowmeter allows for or enables one way to make the determination of the corrections in accordance with the present invention. Of course the parameters as k, $c_p$ and q, of the gas can be determined by other means if such are desirable in other applications.

Figure 2:
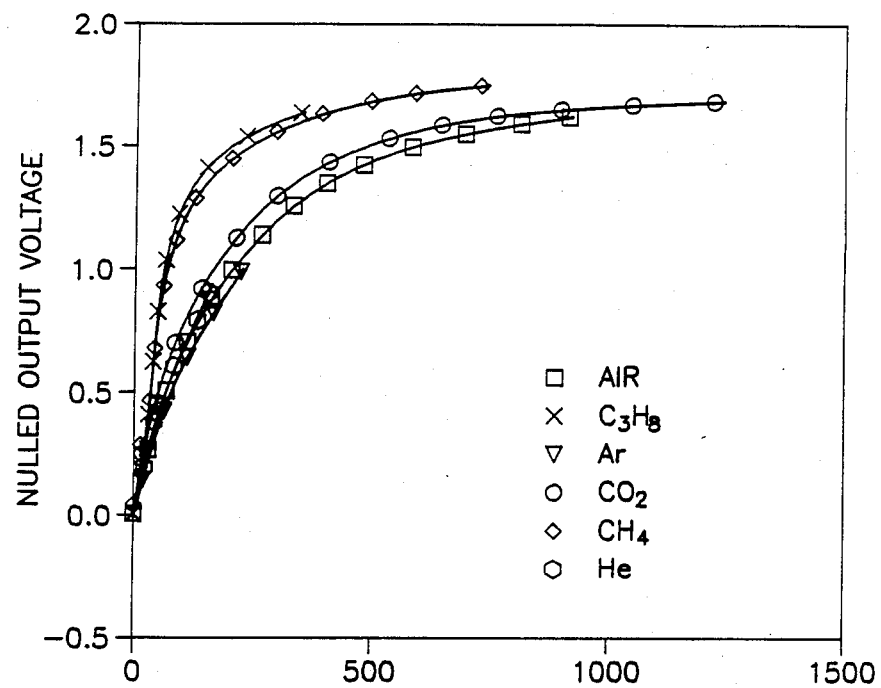
FIG. 2 is a graphic representation depicting output vs. mass flow measurement for various gases in linear coordinates, with its associated uncorrected error.
Figure 3:
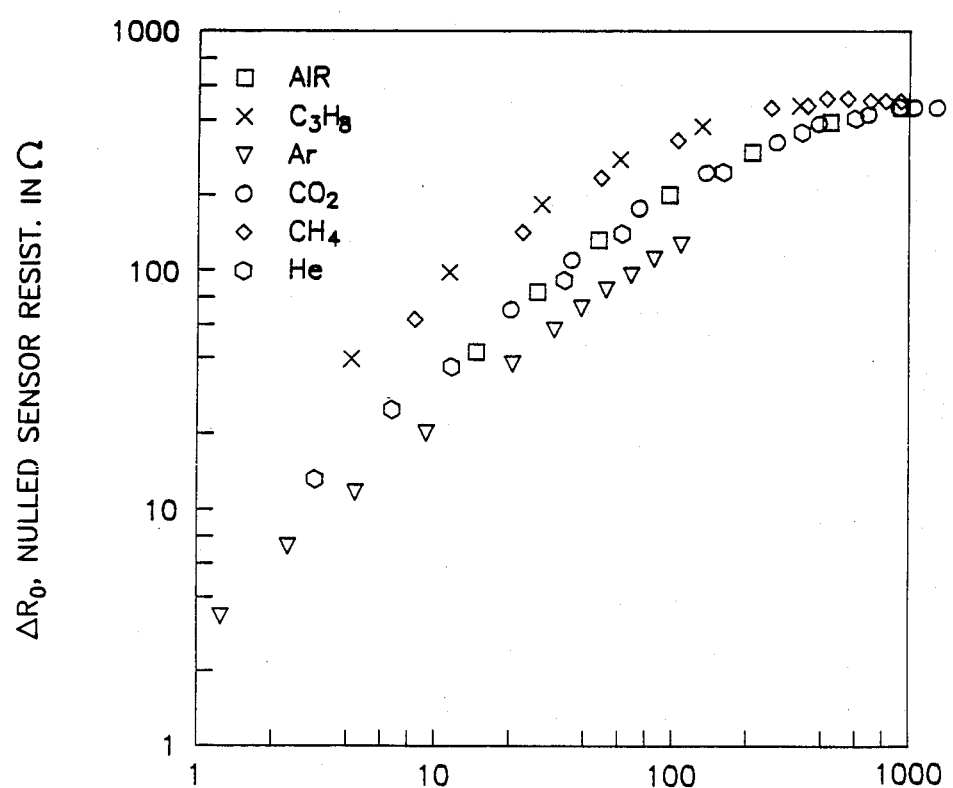
FIG. 3 shows the same data as FIG. 2 plotted as sensor resistance vs. nulled mass flow in a log-log plot in order to make the differences in data points at low flow more visible.

FIG. 2 shows the nulled sensor output plotted against the nulled mass flow readings for six different gasses. The actual readings, to be accurate, and, thus, not require correction, of course, should coincide, i.e., the same mass flow of any fluid of interest should produce the same output voltage. The uncorrected data shows considerable deviation among the various gases. FIG. 3 represents what amounts to the data of FIG. 2 plotted as log-log functions. There the signal output is shown in terms of sensor resistance rather than voltage output to expand the vertical axis. FIG. 3, demonstrates the disparities of FIG. 2 somewhat more dramatically, especially at the lower flow rates, i.e., <100 mg/min.

Figure 4:
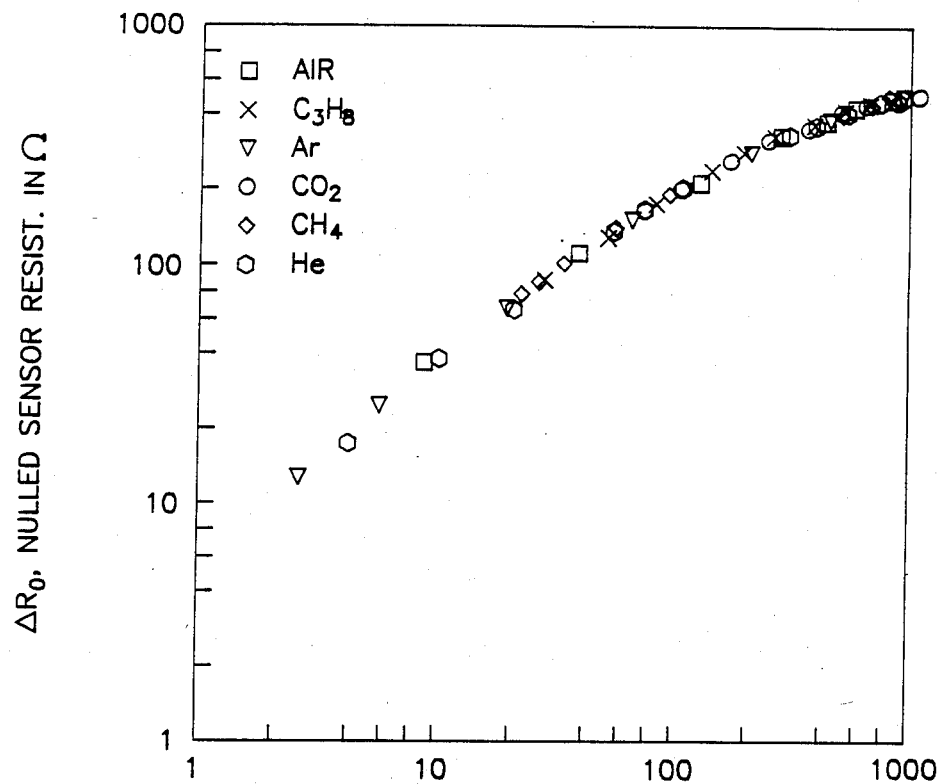
FIG. 4 shows the effect of applying the correction factor, M, with respect to nulled mass flow in relation I to the gases of FIG. 3.

FIG. 4 shows the data of FIG. 3 plotted with the discovered correction relationship I applied to $M_o$. The virtual coincidence of the data points at all but very low flow rates is noteworthy. This indicates very close correlation over a wide range of flows and also with respect to several types of gas molecules from inert to covalent.

Figure 5:
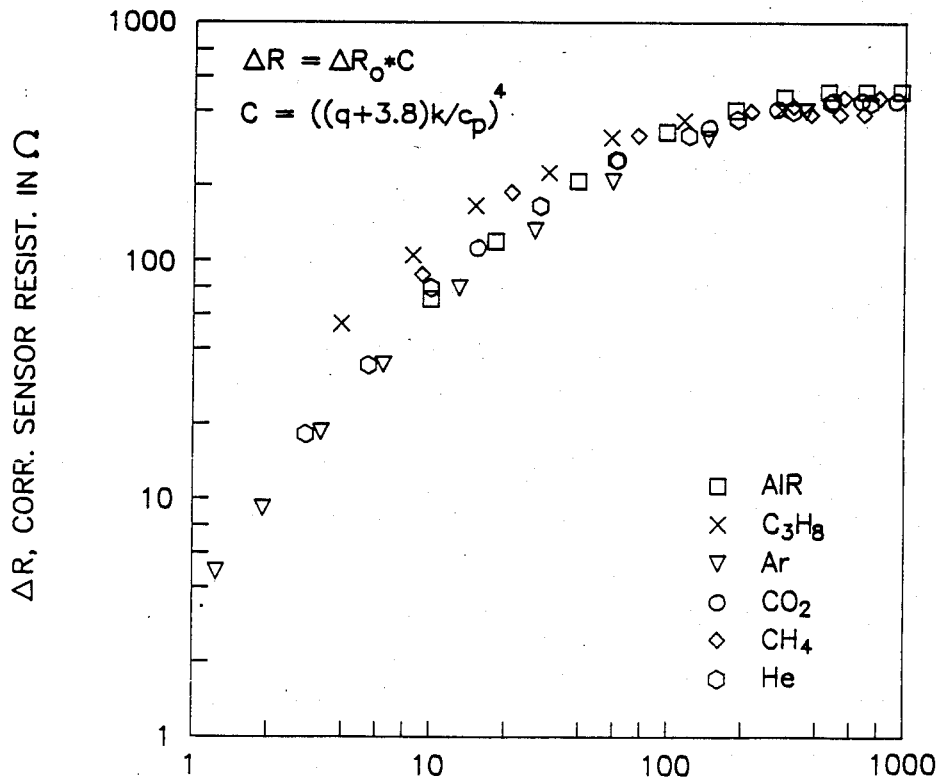
FIG. 5 shows the effect of the signal correction with respect to the nulled signal in relation II for the gases of FIG. 3.

FIG. 5 depicts the application of the discovered correlation relationship II; while not as accurate as the correction relationship I, II is useful as accurate enough for some applications especially at the higher flow rates.

Thus, in accordance with the invention a simple universal correction factor has been discovered which solves an important measurement accuracy problem in simple fashion. The correction factor is easily implemented in the signal processing system of meters of the class described.

What is claimed is:

1. A method for compensating the mass flow measurement of a fluid flowmeter of the thermal microanemometer class for changes in the composition of the fluid of interest the flow of which is sought to be determined or monitored comprising the steps of:
    obtaining an on-going uncorrected nulled mass flow value ($M_o$) for the fluid of interest in relation to the microanemometer sensor output;
    obtaining the specific heat ($c_p$) thermal conductivity (k) and density (q)
    obtaining the corrected mass flow (M) from the nulled mass flow according to the relationship $$M = \frac{M_o\, c_p}{k\,(3.8 + q)}$$

2. The method of claim 1 wherein said $c_p$, k and q values are derived from a static anemometer measurement of the fluid of interest.

3. A method for compensating compositional changes with respect to the actual dynamic sensor flow output signal from a microanemometer flow sensor in a mass flowmeter of the thermal microanemometer class conducting a fluid of interest comprising the steps of:

obtaining the nulled microanemometer sensor output signal in relation to the mass flow of the fluid of interest;

obtaining the specific heat ($c_p$) thermal conductivity (k) and density (q);

obtaining the corrected sensor output (s) from the nulled sensor output according to the relationship $$S = S_o\{k(3.8+q)/c_p\}^{0.4} \tag{II}$$

4. The method of claim 3 wherein said $c_p$, k and q values are derived from a static anemometer measurement of the fluid of interest.

* * * * *